Aug. 29, 1972　　　S. H. BUNCHEZ　　　3,687,710
METHOD FOR TREATING PHOTOGRAPHIC FILM
Filed May 25, 1971
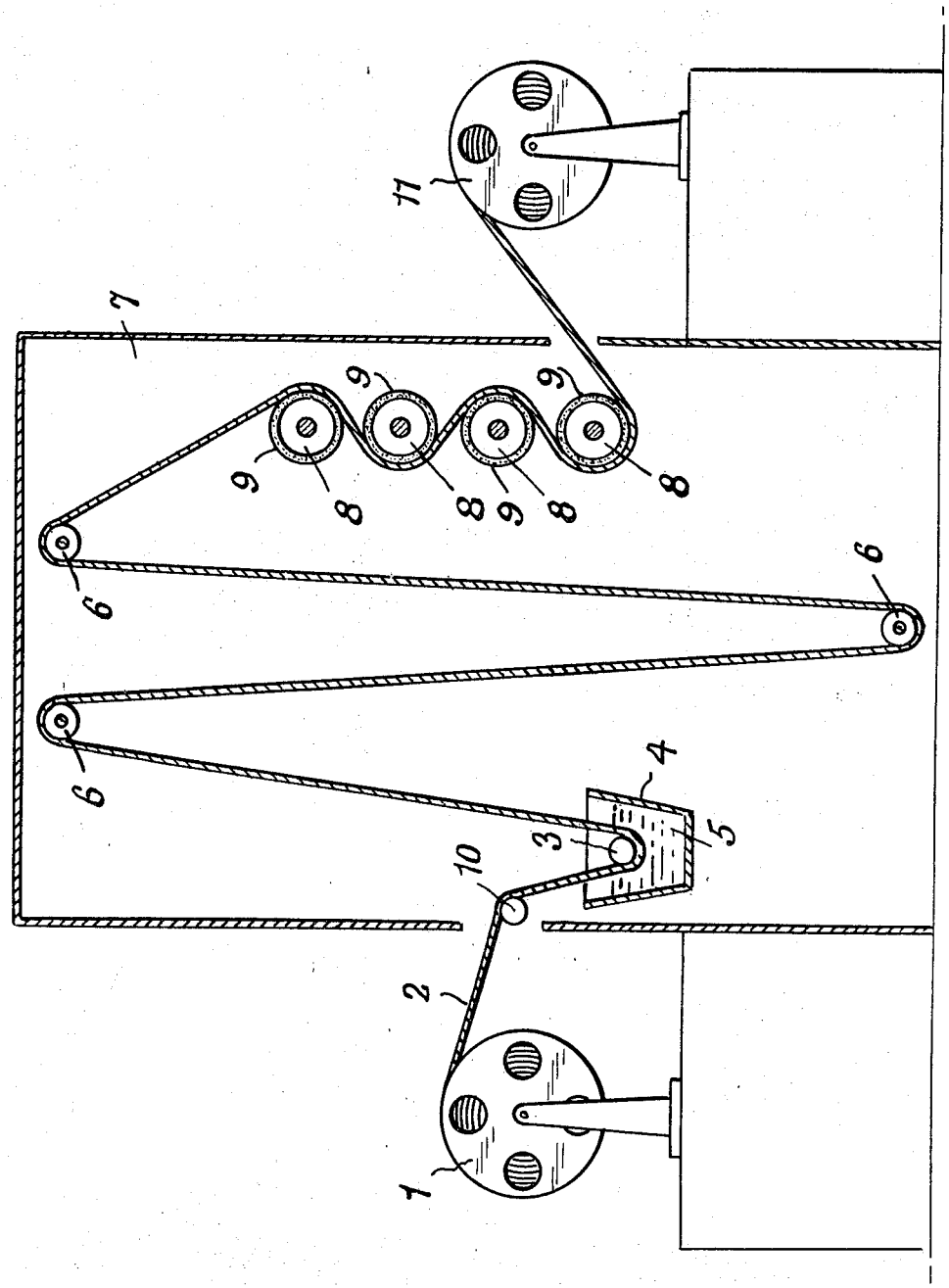
INVENTOR.
Samuel H. Bunchez
BY
Attorney

United States Patent Office 3,687,710
Patented Aug. 29, 1972

3,687,710
METHOD FOR TREATING PHOTOGRAPHIC FILM
Samuel H. Bunchez, c/o Vacuumate Corporation,
427 W. 42nd St., New York, N.Y. 10036
Continuation-in-part of abandoned application Ser. No. 592,493, Nov. 7, 1966. This application May 25, 1971, Ser. No. 146,842
Int. Cl. B44d 5/08; C08h 9/00
U.S. Cl. 117—64        2 Claims

ABSTRACT OF THE DISCLOSURE

The assembly is used to effect a method for treating exposed photographic film strip for use in projectors. The exposed photographic film is fed through a bath of lubricating material specifically employed for treating exposed photographic film. Film strip is fed into the lubricant bath to completely coat both sides thereof. The coated strip is then sequentially fed through a heated drying zone to dry the lubricant material thereon and subsequently the film is buffed on both dry, coated sides in a polishing work station to smooth the coating along both faces and the edges thereof. In a specific embodiment of the invention, the film is fed through a sinuous path between at least two polishing rollers located at a polishing work station to effect the desired smoothing operation. Other specific embodiments of the invention are also disclosed.

RELATED APPLICATIONS

This application is a continuation-in-part application of the parent application Ser. No. 592,493 filed Nov. 7, 1966, entitled "Apparatus and Method for Treating Photographic Film," and now abandoned.

BACKGROUND OF THE INVENTION

The problem of preserving film and protecting it from shrinkage and brittleness is well known. Motion picture film requires special treatment in order to resist the effects of excessive internal heat and to overcome the friction of one layer of the film against another. The use of exposed photographic film in a continuous loop or cartridge load projector especially has the problem of the retention of heat in an enclosed projector and in the short roll of film. The heat reduces the moisture content of the film thereby resulting in stiffness which causes distortion or cracking of the film. There is constant movement of the convolutions of the film against each other thereby introducing the problem of frictional slippage.

A prior art method for reconditioning film is disclosed in United States Patent No. 2,846,334, issued Aug. 5, 1958. In this prior art method for reconditioning exposed photographic film, the film is placed in a chamber similar in design to an autoclave. The chamber is sealed and a vacuum within one quarter (¼) of an inch of atmospheric pressure is drawn. A chemical compound is introduced into the apparatus in liquid form. The liquid, which is made up of elements having different vapor points, goes through a vaporizing chamber. The elements are vaporized successively, and these vapors pass through the coils of the film causing certain changes in the physical properties of the film. Most of the easily lost water content is replaced by an internal moistener that is less volatile than water. This prior art treatment gives the film the viability reserve it needs to resist the effects of excessive heat.

The method in accordance with this invention is an improvement over this prior art process and is one which can be used supplementary to the prior art method thereby materially improving the film that has been treated thereby.

PURPOSE OF THE INVENTION

It is a primary object of this invention to produce an assembly and method for conditioning exposed photographic film to preserve the film, increase its useful life, and to materially improve its progress through a projection apparatus.

It is another object of this invention to provide a method and apparatus for treating an exposed photographic film with a particular type of lubricating material which is applied and polished in a specific manner.

SUMMARY OF THE INVENTION

A supply of exposed photographic film strip is fed into a chemical lubricating bath to completely coat both sides thereof. The lubricant bath contains a chemical compound which is a lubricating fluid or humectant having a suitable solvent base. In a specific embodiment, stearic acid, oleic acid and powdered talc are mixed in methyl chloroform. After coating in the chemical lubricant bath, the film is sequentially fed from the bath through a heated drying zone to dry the lubricant material thereon. The film is next subjected to a buffing or polishing step which is accomplished in a specific embodiment by passing the film in a sinuous bath between a plurality of rollers. The rollers are faced on their peripheries with a soft, fibrous, or pile-bearing material, such as velvet or felt, or some other material of similar characteristics. In this manner, both faces of the film are subjected to a buffing or polishing action resulting in the film emerging from the polishing rollers with its surfaces smooth and lustrous. The buffing step is accomplished along both faces of the film as well as the edges thereof. The buffing step tends to remove all excess surface lubricants so that any unevenness in the film such as might be present to catch and cause the film to tear will be eliminated. The film, after having been polished as above described, is next received on a takeup reel ready for use in a projector.

BRIEF DESCRIPTION OF DRAWING

Other objects of this invention will appear in the following description and appended claims, reference being made to the accompanying drawing which forms a part of this specification.

The sole figure is a diagrammatic illustration of an apparatus constructed in accordance with this invention and capable of carrying out the method of the invention. The thickness of the film strip is shown disproportionately in the drawing in order to more clearly disclose the course of the film strip through the assembly.

DESCRIPTION OF SPECIFIC EMBODIMENTS

More specifically, exposed photographic film 2 is supplied on the reel 1 and is in readiness for the treatment performed according to the method of the present invention in the shown assembly. The film 2 in one specific embodiment has been treated in accordance with the method disclosed in U.S. Pat. No. 2,846,334. See in particular the two examples. Also disclosed are several lubricating materials for exposed photographic film.

The exposed photographic film strip 2 is drawn from the reel 1, fed through an apparatus constructed in accordance with this invention, and finally taken up on reel 11. Movement through the assembly is effected by any suitable means. The film 2 passes over the guide roller 10 and then under a roller 3 that is located in a heated receptacle 4. A liquid chemical composition 5, which is effective as a lubricant or humectant with a solvent base, is disposed in the bath and coats the entire film strip 2 as it passes therethrough. The composition of the liquid 5 comprises stearic acid, oleic acid and powdered talc in a base of methyl chloroform. The lubricant composition acts to materially aid in lending flexibility and pliability to the film 2.

After having been treated by the composition 5, the moist film 2 then proceeds around spaced rollers 6 through a drying stage. The rollers 6 may be peripherally covered with nylon or other suitable material. After leaving the drying rollers 6, the film 2 then proceeds to a buffing means including at least two polishing rollers. In this specific embodiment, a gang of polishing rollers 8 is arranged in superimposed relation and in close proximity to each other so that the film 2 passing between the rollers 8 pursues a sinuous course between them substantially as shown.

The rollers 8 have peripheral faces 10 composed of a material capable of imparting a polish luster to both faces and the edges of the film. Such facing material may consist of felt, velvet, other pile material or the like. As the film 2 passes between the rollers 8 in a sinuous path, it receives a surface polish or buffing on its opposite faces. The polished surface thereby facilitates the progress of the film 2 through a projector or other apparatus after having completed the conditioning method of this invention.

In this specific embodiment, a chamber 7 is disposed around the receptacle 4, the rollers 6 and the polishing rolls 8. Thus, a chamber housing encloses a first lubricant applying work station, a drying work station and a polishing work station, respectively. The chamber housing 7 provides a means for maintaining the temperature around the various elements of the assembly to facilitate drying of the film as well as effect the heating of the material in the receptacle 4.

By providing a lubricating material as disclosed herein on the film 2 and subsequently followed by drying and polishing, the film 2 is rendered pliable, less brittle and extremely facially smooth. The conditioning of the invention greatly facilitates the progress of the film 2 through a projection apparatus.

In some instances, small size film is produced by longitudinally splitting larger width films. For example, 8 mm. size film may be produced by splitting 16 mm. film. The splitting of the film often results in the creation of minute roughness and particles of film along the cut edge. By passing the film so produced sinuously between rollers 8, the roughness of the film is reduced if not removed altogether along its edge. Any small particles of the film likely to gather in a film gate or clog the mechanism of the projector will be eliminated through the processing of the film in the assembly of this invention. Therefore, the film is not only conditioned and preserved, but it is prevented from becoming brittle, it is rendered more flexible and the smoothness and polish provided on its surface greatly improves the performance of the film through the projection apparatus.

While treatment of a single strip of film has been discussed herein, it will be understood that the assembly may be adapted to handle a substantial number of film strips disposed in side-by-side relationship so that they may be treated simultaneously. This would necessitate the lengthening of the several rollers to accommodate a plurality of film strips placed side-by-side along the length of the rollers. In addition, the rollers may also be peripherally grooved as required for the guidance of the plurality of film strips.

While the method and assembly for conditioning photographic film has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. The method of conditioning photographic film strip for use in projectors comprising the steps of:
    (a) providing a supply of exposed photographic film strip to be conditioned,
    (b) providing a bath of material for lubricating said film comprising stearic acid, oleic acid and powdered talc and methyl chloroform,
    (c) feeding said film strip into said lubricant bath to completely coat both sides of said strip,
    (d) sequentially feeding said coated strip from said bath through a heated drying zone to dry said lubricant material, and
    (e) buffing both dry, coated sides of said continuous film strip in a polishing work station to smooth the coating along both faces and edges of said coated strip.

2. A method of conditioning photographic work film strip for use in projectors comprising the steps of:
    (a) providing a supply of exposed photographic film strip to be conditioned,
    (b) placing the film strip in a vacuum chamber,
    (c) subjecting said film strip to different vaporized elements successively to cause changes in the physical properties of the film wherein most of the water content lost therefrom is replaced by an internal moistener that is less volatile than water,
    (d) feeding the film strip into a bath of material for lubricating said film comprising stearic acid, oleic acid, powdered talc and methyl chloroform,
    (e) sequentially feeding the film strip from the bath through a heated drying zone, and
    (f) buffing both dry coated sides of the continuous film strip in a polishing work station to smooth the coating along both the faces and edges of the coated strip.

References Cited
UNITED STATES PATENTS

| | | | |
|---|---|---|---|
| 690,007 | 7/1901 | Armitage | 108—106 |
| 1,623,528 | 4/1927 | De Moos | 117—64 |
| 1,816,409 | 8/1953 | Snowman | 117—64 |
| 2,649,386 | 8/1953 | Snowman | 117—64 |
| 2,790,730 | 4/1957 | Trosset | 117—64 |
| 3,041,196 | 6/1962 | Stella | 117—144 |
| 326,688 | 9/1885 | Sparks | 117—64 |
| 394,268 | 12/1888 | Haynes | 118—124 |
| 1,773,167 | 8/1930 | Bronander | 118—124 |
| 2,977,243 | 3/1961 | Meier | 117—115 |

FOREIGN PATENTS

| | | | |
|---|---|---|---|
| 256,244 | 8/1924 | Great Britain | 117—144.5 |

WILLIAM D. MARTIN, Primary Examiner

W. R. TRENOR, Assistant Examiner

U.S. Cl. X.R.

117—2, 119, 144.5; 118—65, 118, 419